United States Patent [19]

Ashley et al.

[11] Patent Number: 5,295,136
[45] Date of Patent: Mar. 15, 1994

[54] METHOD OF PERFORMING CONVERGENCE IN A, LEAST MEAN SQUARE, ADAPTIVE FILTER, ECHO CANCELLER

[75] Inventors: James P. Ashley, Downers Grove; Quoc Nguyen, Lake Zurich, both of Ill.

[73] Assignee: Motorola, Inc., Schaumburg, Ill.

[21] Appl. No.: 867,555

[22] Filed: Apr. 13, 1992

[51] Int. Cl.$^5$ .............................................. H04B 3/23
[52] U.S. Cl. .................................. 370/32.1; 379/411
[58] Field of Search ............... 370/32.1, 32; 379/410, 379/411; 375/103, 14; 364/724.16, 724.19

[56] References Cited

U.S. PATENT DOCUMENTS

| | | | |
|---|---|---|---|
| 4,736,414 | 4/1988 | Montagna et al. | 370/32.1 |
| 4,805,215 | 2/1989 | Miller | 370/32.1 |
| 5,001,701 | 3/1991 | Gay | 370/32.1 |
| 5,007,044 | 4/1991 | Miyoshi et al. | 370/32.1 |
| 5,029,167 | 7/1991 | Arnon et al. | 370/32.1 |

*Primary Examiner*—Douglas W. Olms
*Assistant Examiner*—Hassan Kizou
*Attorney, Agent, or Firm*—Jon P. Christensen

[57] ABSTRACT

A method is described of decreasing convergence time in an adaptive echo canceller. The method includes the step of locating a primary echo within a filter vector based upon relative tap values within the filter vector. The filter vector is then narrowed, based upon the located taps. An estimated error is determined based, in part, upon the narrowed filter vector. An updated filter vector is produced based, in part, upon the estimated error.

4 Claims, 7 Drawing Sheets

METHOD OF PERFORMING CONVERGENCE IN A, LEAST MEAN SQUARE, ADAPTIVE FILTER, ECHO CANCELLER

FIELD OF THE INVENTION

The field of the invention relates to adaptive echo cancellers and more specifically, to least mean square, adaptive filter echo cancellers.

BACKGROUND OF THE INVENTION

Echo cancellation in long distance telephonic communication transactions is known in the art. The need for echo cancellation, as is known in the art, arises from impedance mismatches associated with wireline telephone subscribers and an economic decision by telephone carriers to use two-wire connections between wireline subscribers and central telephone offices.

Two-wire connections, as is known, requires that a duplex telephone signal (transmit and receive) be mixed for exchange of signals between the central telephone office and the wireline subscriber. The mixing of transmit and received signals results in a portion of a received signal being re-transmitted as an outgoing signal from a receiving subscriber to a transmitting subscriber. While the re-transmitted signal may be perceived as a "hollow" sound to local communicators, the re-transmitted signal may represent a distracting echo in long distance communications.

The delay experienced by a subscriber between a transmission and an echo may be a determining factor in the acceptability and useability of the communication channel. Short delays experienced between local communicators (e.g. 1–20 milliseconds) typically doesn't represent an impediment to the efficient exchange of spoken words. Longer delays (e.g. 250–500 milliseconds), on the other hand, may result in syllables and, even, entire words being repeated as an echo and may render the communication channel unusable.

The advent of digital mobile communication systems has exacerbated the problem of time delays (and concurrent need for echo cancellation). Vocoder delays, convolutional coding algorithms, etc. typically introduce signal delays in mobile communication circuits, typically, in the area of 200 milliseconds.

The solution to the problem of echos, since the advent of the digital computer, has been through the construction of computer based echo cancellers. Echo cancellers have typically been based upon adaptive finite impulse filters (AFIRs) (see *Adaptive Filter Theory*, 2nd ed., by Simon Haykin, Prentice Hall, 1991). AFIRS provide for echo cancellation by generating a mathematical model of the echo characteristics of a communication system as a step in canceling the echo.

The mathematical model (adaptive echo canceller) as developed by Haykin (supra) includes an adaptive filter (filter vector) that operates on a reference sensor output (signal vector) to produce an estimate of the noise (echo), which is subtracted from a primary sensor output (signal, containing echo). The overall output of the adaptive echo canceller is then used to control adjustments made to tap values of the filter vector. The operation of the Haykin adaptive filter may be described in terms of three basic equations as follows:

1. Filter output $$y(n) = f_n x_n = \sum_{i=0}^{L-1} f(i)x(n-i)$$

2. Estimation error $$e(n) = x(n) - y(n)$$

3. Tap-weight adaptation $$f_{n+1} = f_n + \mu e(n) x_n,$$

where the value, $\mu$, represents an adaptation constant.

The adaptation constant, $\mu$, (as taught by Haykin) is chosen to be as large a value as possible as a means of increasing a speed of filter convergence. Too large a value, on the other hand, leads to filter instability.

While the Haykin adaptive echo canceller works well within fixed transmission systems, difficulties are often experienced in changing environments, such as within a trunking system. Trunking systems, as is known in the art involve multiple and changing transmission parameters.

Where a trunking connection involves long time delays in signal transmission (caused by long distances in analog systems or vocoder processing times in a digital system) multiple echos may be present necessitating large filter vectors. Large filter vectors result in increased processing time and a decrease in convergence time. Where a filter is involved in a trunking operation the filter may be alternately switched in and out of circuits involving both long and short time delays and single or multiple echos.

Where short time delays (or single echos) are involved small filter vectors may be appropriate. Where long time delays, or multiple echos are experienced, a much larger filter vector may be needed. Because of the importance of echo cancellation, both to analog systems and to digital mobile communication systems, a need exists for an echo canceller with a convergence time less dependent upon trunking connection.

SUMMARY OF THE INVENTION

A method is offered of performing convergence in an adaptive echo canceller. The method comprises the steps of locating a primary echo within a filter vector of a received signal based upon a plurality of relative tap values and narrowing the filter vector based upon the plurality of relative tap values. The method further includes the steps of estimating an error based upon the narrowed filter vector and producing an updated filter vector based upon the estimated error.

DETAILED DESCRIPTION OF THE PREFERRED EMBODIMENT

The solution to the problem of increasing the speed of convergence in echo cancellation in digital systems lies, conceptually in identifying the location of a primary echo in an echo filter vector, dividing the vector into primary and secondary vectors and increasing an adaption rate relative to filter locations proximate the primary echo. The primary echo has been determined to have at least a 90% probability of containing, substantially, all the echo energy. Increasing an adaption rate relative to the primary echo provides the beneficial effect of allowing the echo filter to converge quickly without instability. Convergence within the remainder of the echo filter may be allowed to proceed at a slightly increased rate.

Figure 1:
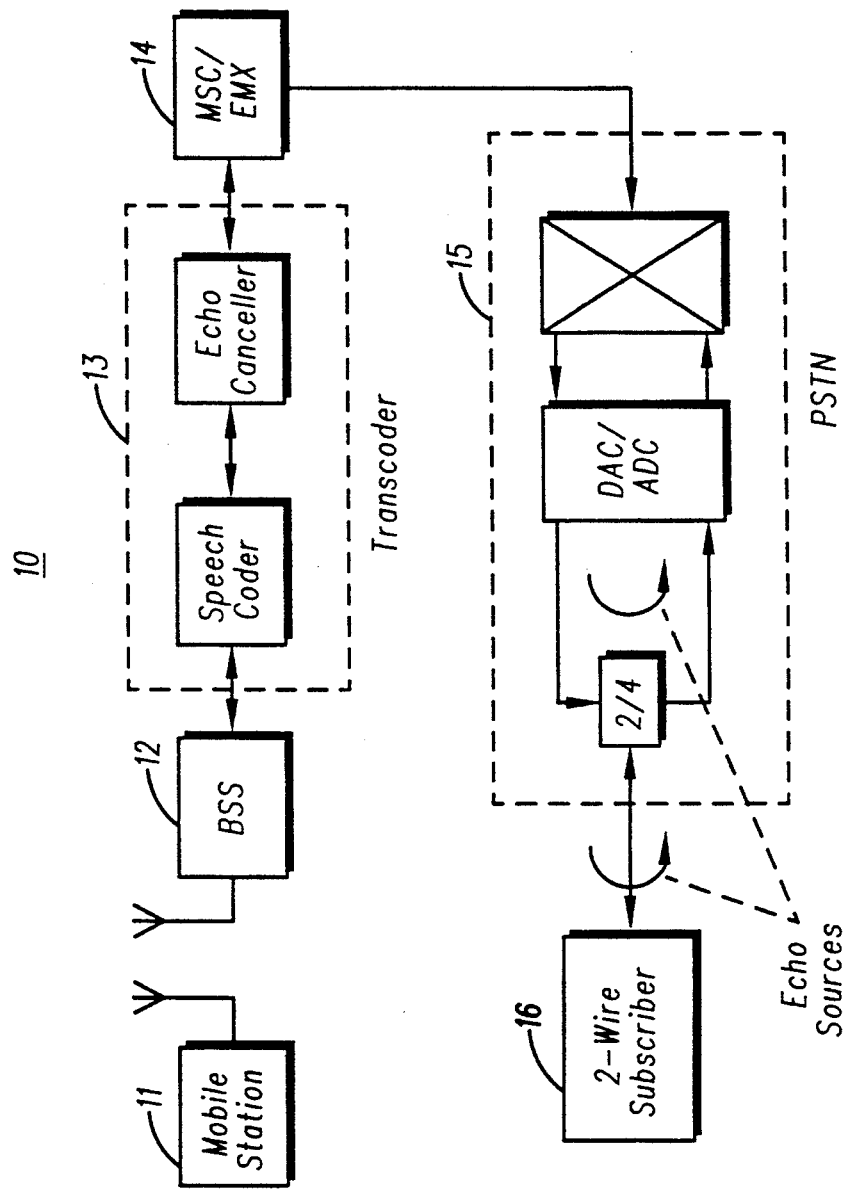
FIG. 1 comprises a block diagram of a radiotelephone communication system in accordance with the invention.

Shown in FIG. 1 is a digital communication system, generally, (10) using echo cancellation in accordance with the invention. Included within such a system is, typically, a number of mobile station (MSs) (11) (one of which is shown), a base station system (BSS) (12), a transcoder (13), an electronic mobile exchange (MSC/EMX) (14), a public switched telephone network (PSTN) (15), and a wireline subscriber (16). The transcoder (13) (typically located within the BSS (12)) is shown as a separate block (13) for purposes of explanation.

While useful in any digital communication system, the system used in this embodiment is a time division multiple access (TDMA) system and may operate under signaling protocols specified by the Groupe Special Mobile (GSM) Pan-European cellular system, as described in GSM recommendations available from the European Telecommunications Standards Institute (ETSI). Under GSM a two-way duplex signal may be exchanged between a mobile station (MS) (11) and base station system (BSS) (12) under a TDM/TDMA format. Speech signals encoded within the MS (11) are decoded within the transcoder (13) for transmission to a subscriber (16). Signals originating from the subscriber (16) are encoded within the transcoder (13) for transmission to the MS (11).

Echos generated within the subscriber interface (16) and 2/4 wire interface within the PSTN (15) are canceled within the transcoder (13), in accordance with the invention. The transcoder (13), in one embodiment of the invention, may be a digital signal processor (DSP) (e.g. DSP56156 available from Motorola, Inc., or equivalent) capable of speech transcoding and echo cancellation algorithms on an interrupt driven or batch processing basis.

Turning now to operation of the echo canceller, a description of the echo cancellation algorithm will be given in terms of operation within the DSP (it being understood that the DSP also functions as a transcoder). As a transcoder, the DSP serves as both as a source and a destination of signals for the echo canceller. For simplicity, in subsequent discussions, transcoder and echo function will be shown as separate operational blocks.

Figure 2:
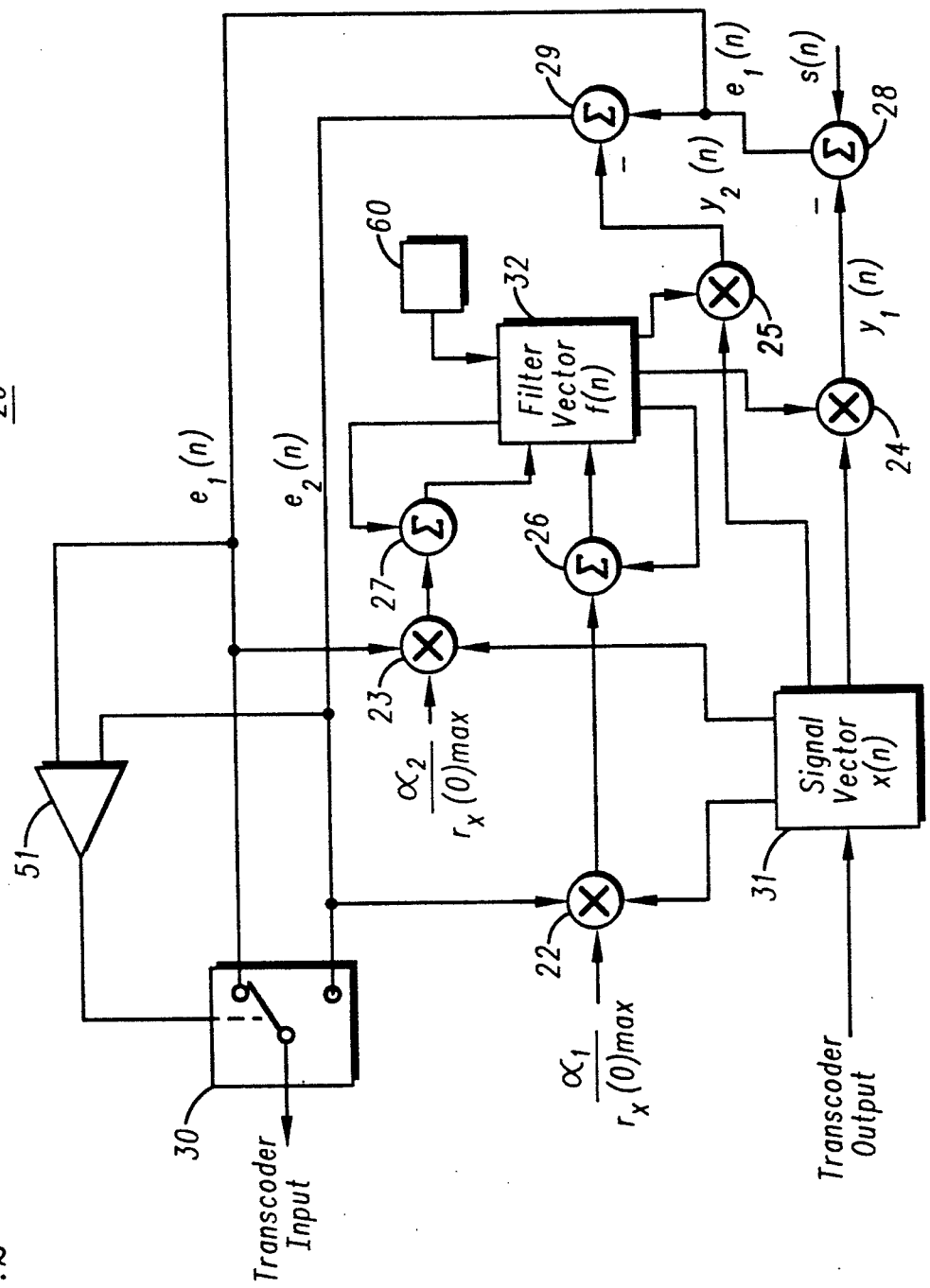
FIG. 2 comprises a block diagram of an echo canceller in accordance with the invention.

Shown in FIG. 2 is a simplified block diagram of an echo canceller, generally, (20), in accordance with the invention. Included within the echo canceller (20) is a signal vector register (31), a filter vector register (32), multipliers (22, 23, 24, and 25) and summers (26, 27, 28 and 29). The signal vector (31) and filter vector (32) registers are of equal correlative length and of sufficient length to include a primary and any secondary echos reasonably expected in normal operation (e.g. 512 "taps").

The signal vector, x(n), within the taps of the signal vector register (31) represents a "history" of signals originating from the transcoder (origin signal vector). During operation of the echo canceller (13, FIG. 1) the signal vector, x(n) (31), is vector multiplied (24 and 25) by the filter vector, f(n) (32). The scalar product, y(n), of the vector multiplication is then subtracted (28 and 29) from a return signal, s(n), containing an echo. The difference, e(n), provides an estimate of a filter error (error estimation). The error estimation contains a return signal and is applied to the transcoder input as an information signal.

The error estimation, e(n) is then multiplied (22 and 23) by a base adaptation rate $(\alpha/r_x(0)_{max})$ (producing a scalar product) and by the signal vector, x(n) (31). The product of the scalar and vector multiplication (adaptation vector) is then vector added (26 and 27) to the filter vector $(f_n)$ to produce an updated filter vector $(f_{n+1})$.

Figure 3:
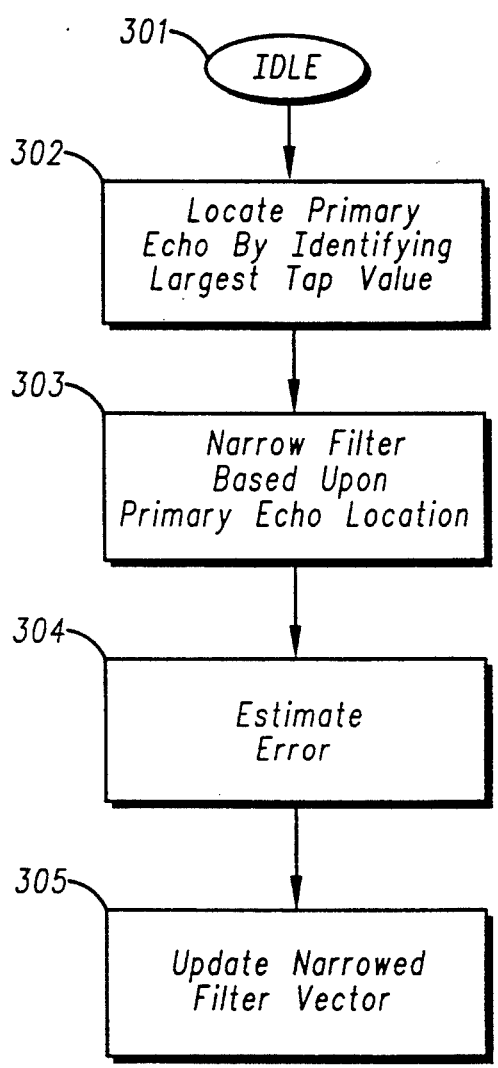
FIG. 3 comprises a flow chart of operation of the echo canceller in accordance with the invention.

Shown in FIG. 3 is a simplified flow chart of echo canceller operation under the invention. In accordance with the invention, convergence of echo cancellation is increased by locating (302) a primary echo within the filter vector, and narrowing (303) a primary vector processing area to those taps proximate the primary echo. Convergence may then be expedited through the use of a narrow vector adaptation rate which, in one embodiment of the invention, is a multiple of the base adaptation rate. The narrow vector adaptation rate is used to create a primary adaptation vector which may then be added to the primary vector processing area. Convergence within the remainder of the filter vector in any secondary processing areas (hereinafter sometimes referred to as a secondary vector) may then proceed at a slightly increased adaptation rate over the base rate through use of a secondary adaptation rate to produce a secondary adaptation vector.

Error estimation and adaptation within the echo canceller for primary echo and secondary echos may be described by the following equations:

$$y_1(n) = f_{1n}Tx_{1n} = \sum_{i=\Delta_1}^{\Delta_2-1} f(i)x(n-i)$$

$$y_2(n) = f_{2n}Tx_{2n} = \sum_{i=0}^{\Delta_1-1} f(i)x(n-i) + \sum_{i=\Delta_2}^{L-1} f(i)x(n-i),$$

and $$e_1(n) = s(n) - y_1(n)$$

$$e_2(n) = e_1(n) - y_2(n),$$

where y₁(n) represents the primary vector product of the narrowed filter vector and narrowed origin signal vector for the primary echo in the primary processing area between limits of $\Delta_1$ and $\Delta_2-1$. The term, y₂(n) represents the secondary vector product of the secondary vector and correlative origin vector in secondary processing areas for any secondary echos lying between the limits 0 to $\Delta_1-1$ and $\Delta_2$ to $L-1$ (where L=total filter length).

The value $e_1(n)$ represents a primary error estimation of the return signal minus the primary echo. Without the contribution of the primary echo the value $e_1(n)$ becomes a measure of secondary echos in secondary processing areas. The value $e_1(n)$ may then be used to generate a secondary error term $e_2(n)$ (canceling secondary echos) by subtracting the contribution of the secondary processing areas, $y_2(n)$. The average power of each of the error terms ($e_1(n)$ and $e_2(n)$) is then estimated. The error term ($e_1(n)$ or $e_2(n)$) providing the lowest average power is selected (30) as a signal output from the echo canceller to the transcoder.

The average power of the error terms may be estimated through use of the equation as follows:

$$ry^n(0) = \zeta ry^{n-1}(0) + (1-\zeta)\gamma^2(n)$$

where the terms, $ry^n$ and $ry^{n-1}$, represents average power, $\zeta$ represents a leaky integrator constant (typically 0.975), and $\gamma$ represents a current signal value. (For an understanding of average power calculations, see *Theory and Design of Adaptive Filters*, by Treichler et al., Wiley, 1987). Average power, in accordance with the teachings of the invention, is calculated for four signals: average origin signal, $r_x(0)$; return signal power, $r_r(0)$; primary error estimation, $r_{e1}(0)$; and secondary error estimation $r_{e2}(0)$.

The primary echo within the filter vector is identified (302) by locating the largest relative filter tap value. The vector is then narrowed (303) to produce a "narrowed" or "concentrated" vector by reducing the size of the filter vector to an area proximate the primary echo to produce a final, concentrated vector, that in one embodiment may contain one-eighth the number of taps of the original filter vector. The lower limit $\Delta_1$ of the concentrated vector is identified in each step of the reduction process by subtracting 25% of the remaining filter size from the location of the largest tap. The upper limit, $\Delta_2$ identified by adding 75% of the remaining filter size to the location of the largest tap. The reduction process, for example, may occur in three steps in which the number of taps of the filter is halved during each step.

An estimated filter error is beneficially obtained (304) in accordance with the invention, by vector multiplying (24) the concentrated filter vector by a correlative signal vector and summing (28) the negative value of the product with a return signal ($r(n)$). The correlative signal vector is identified by unity of tap location with the narrowed filter vector.

An adaptation value may be used to increase the adaptation rate of the filter vector. The adaptation value is determined by dividing an adaptation factor, $a_1$, by a scaling factor, $r_x(0)_{max}$. The scaling factor is determined from a circular buffer of length, 1, where $1m = L =$ filter length. Entries to the circular buffer are made from a reference power estimator, $r_x(0)$ every m samples. The largest value within the buffer is selected as the scaling factor, $r_x(0)_{max}$.

Updated concentrated filter values (305) are calculated in accordance with the equation:

$f_{1n+1} = f_{1n} + (a_1/r_x(0)_{max})e_1(n)x_{1n}$, or in vector form, $$f_{1n+1}(i) = f_{1n}(i) + (a_1/r_x(0)_{max})e_1(n)x_{1n}(i); \ i = \Delta_1 \ldots \Delta_2 - 1$$

Updated filter vector values outside the concentrated filter are calculated in accordance with the equation:

$f_{2n+1} = f_{2n} + (a_2/r_x(0)_{max})e_2(n)x_{2n}$, or in vector form, $$f_{2n+1}(i) = f_{2n}(i) + (a_2/r_x(0)_{max})e_2(n)x_{2n}(i); \ i = 0 \ldots \Delta_1 - 1, \Delta_2.$$

The narrow vector adaption factor, $a_1$, and secondary vector adaption factor, $a_2$, are calculated in relation to narrow vector limits, $\Delta_2$, and $\Delta_2$ as follows:

$$a_1 = 1/(\Delta_2 - \Delta_1), \text{ and } a_2 = 1/(L - (\Delta_2 - \Delta_1))$$

with initial values of:

$$\Delta_1 = 0, \text{ and } \Delta_2 = L$$

Comparison of average residual signal power within the concentrated vector versus outside the vector beneficially ensures that the echo contribution of any secondary echos are not significant. If it should be determined by comparison of relative power levels that the power outside the concentrated section is smaller than the power within the concentrated section then the narrowed filter vector "opens" to include all taps of the filter vector. Upon opening, the narrow vector limits, $\Delta 1$ and $\Delta 2$, assume values of 0 and L, respectively. The narrow vector adaptation value, $a_1$, reverts to a base adaptation rate of 1/L. Such "opening" ensures convergence of the echo canceller under "worst case" conditions of multiple echos without instability.

In one embodiment of the invention, updating of the filter vector is inhibited upon activation of a detector. The detector is designed to detect an information signal from the PSTN subscriber or an information signal from both MS and PSTN subscribers (hereinafter referred to as a "doubletalk detector"). The doubletalk detector inhibits filter adaptation whenever the estimated power exceeds a threshold value (doubletalk threshold) of the maximum estimated transmit power. Following deactivation of the doubletalk detector filter adaption is inhibited for some predetermined "hangover" time (e.g. 60 ms).

In another embodiment of the invention, after convergence has been sufficiently established, a non-linear processor is enabled to minimize audible effects of short term divergence. Sufficient convergence is established by dividing the maximum average reference power ($rx(0)max$) by the smaller of the primary and secondary errors (re1 and re2) and comparison of the quotient with a clipper threshold. When the quotient exceeds the clipper threshold a center clipper switches a comfort noise generator into the error signal path, $e(n)$, providing a signal to the transcoder.

In another embodiment of the invention, to prevent the gradual divergence of the filter vector, a slow "leakage" term is applied to the coefficients of the filter vector gradually reducing the values of such coefficients. The slow leakage process (60) is activated only when the doubletalk detector is inactive and the reference signal level ($r_x(0)_{max}$) is above a threshold level (e.g. $-48$ to $-40$dB). The leakage term is applied to one tap position per vector update. The leakage function can be expressed in terms of pseudo-code as follows:

IF $(f(n_{mod} L)) > \lambda$, then $f(n_{mod} L) = f(n_{mod} L) - \lambda$,

ELSE, IF $(f(n_{mod} L)) < -\lambda$, then $f(n_{mod} L) = f(n_{mod} L) + \lambda$ where λ is the leakage factor (typically 0.001≦λ≦0.00003), and $n_{mod\ L}$ is the filter coefficient index. A modulo L operator is applied to the index to maintain the buffer limits of 0 to L−1, so that each filter tap is leaked once every L samples.

In another embodiment of the invention a high-pass filter (53) is included to remove any residual DC offset from the signal received from the PSTN, thereby increasing the stability of the adaptive process. The function of the high-pass filter can be expressed by the equation:

$$s(n) = \eta_1 s(n-1) + \eta_2 (r(n) - r(n-1))$$

where $\eta_1 = 0.90$ and $\eta_2 = 0.95$, s(n) is the filtered signal, and r(n) is the returned signal.

Figure 4:
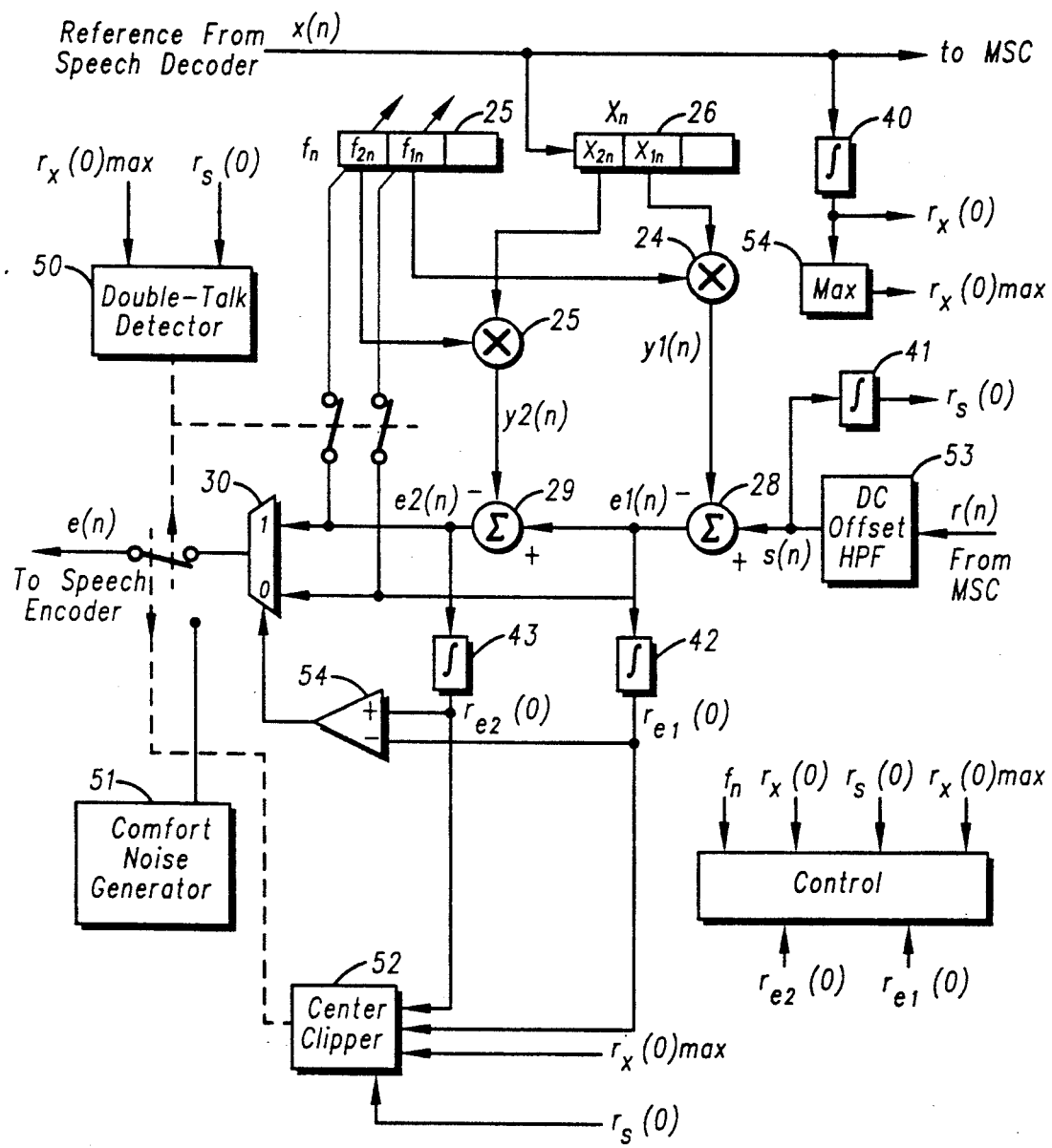
FIG. 4 comprises an expanded block diagram of an echo canceller in accordance with the invention.
Figure 5:
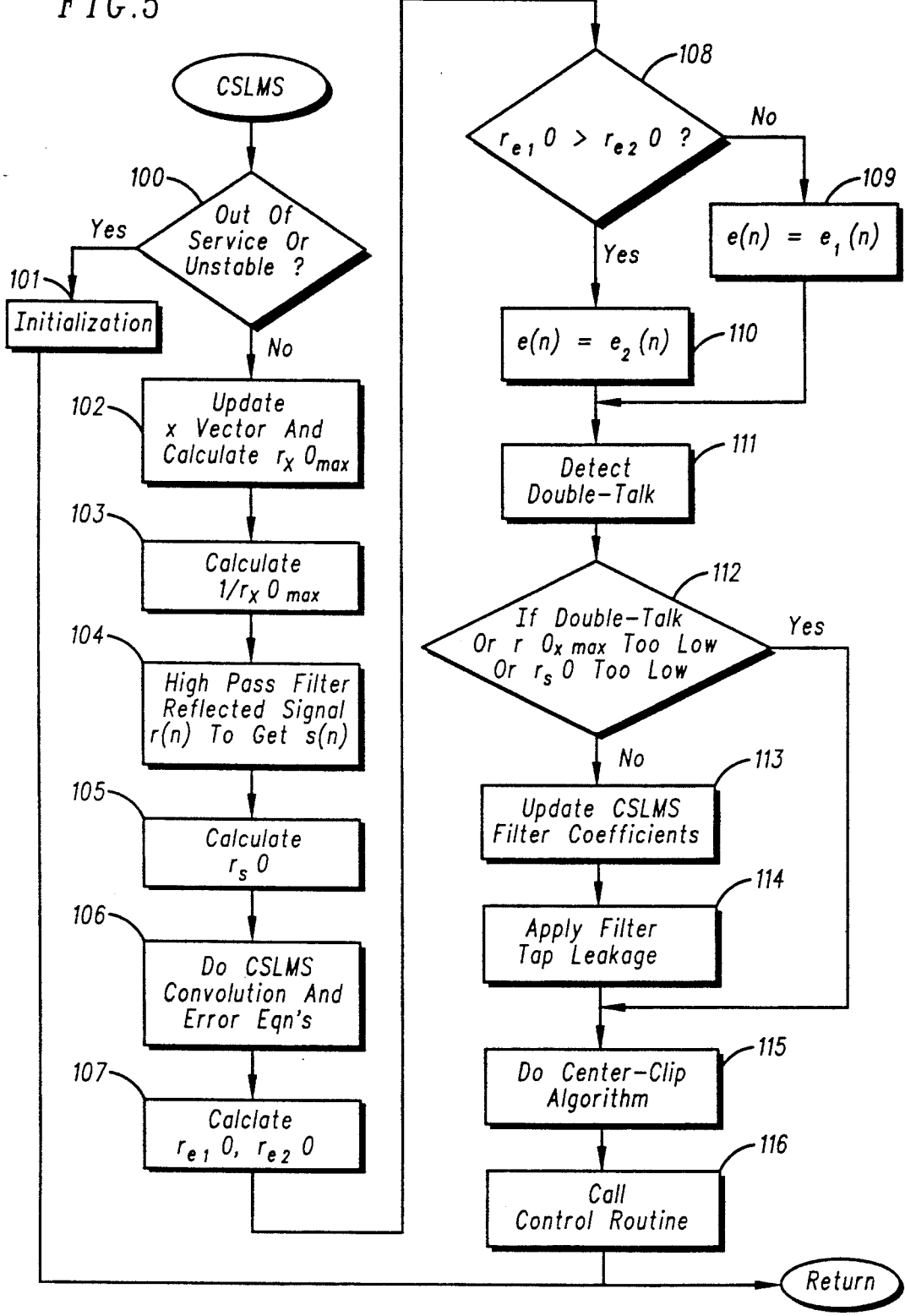
FIG. 5 comprises an expanded flow chart of the echo canceller in accordance with the invention.

Shown in FIG. 4 is a block diagram of an echo canceller using the doubletalk detector (50), center clipper (52), and comfort noise generator (51). FIG. 5 provides a flow chart of echo canceller operation using the doubletalk detector (50), center clipper (52), and comfort noise generator (51).

As shown (FIG. 5) the DSP (13, FIG. 1), proceeds to update the signal vector (31) and calculate an updated maximum average power estimate, $r_x(0)_{max}$, (102). The DSP (13) next proceeds to high-pass filter (104) a return signal, r(n), within a DC offset high pass filter (53) to provide a more reliable FIR signal s(n). The power of a return signal, $r_s(0)$, is estimated (105) within an integrator (41). A concentrated vector ($f_{1n}$) and correlative signal vector ($x_{1n}$), as well as secondary vectors, are convolved to produce a first error estimate ($e_{1n}$) and a secondary error estimate ($e_{2n}$) (106).

The relative power of the estimated errors ($e_{1n}$ and $e_{2n}$) are estimated (107) within integrators (42 and 43). The lowest power estimate ($r_{e1}$ or $r_{e2}$) is determined (108) by comparator (54) activating relay (30) and thereby selecting (109 or 110) the lowest error value ($e_n$) as an input to the encoder.

The relative power of the return signal ($r_s(0)$) and maximum average power estimate, $r_x(0)_{max}$, are compared (111) with a doubletalk detector threshold value in a doubletalk detector (50) and a comfort noise generator is de-activated upon detection that the doubletalk threshold has been exceeded.

The DSP (13) then compares the maximum average power estimate, $r_x(0)_{max}$, and return signal ($r_s(0)$) to determine (112), within a center clipper (52) whether convergence is sufficient to activate (115) the center clipper (52). If convergence is not adequate (112), then the DSP (13) updates the filter coefficients ($f_n$) (113) and applies the leakage factors (60) (114) to the filter coefficients.

Figure 6:
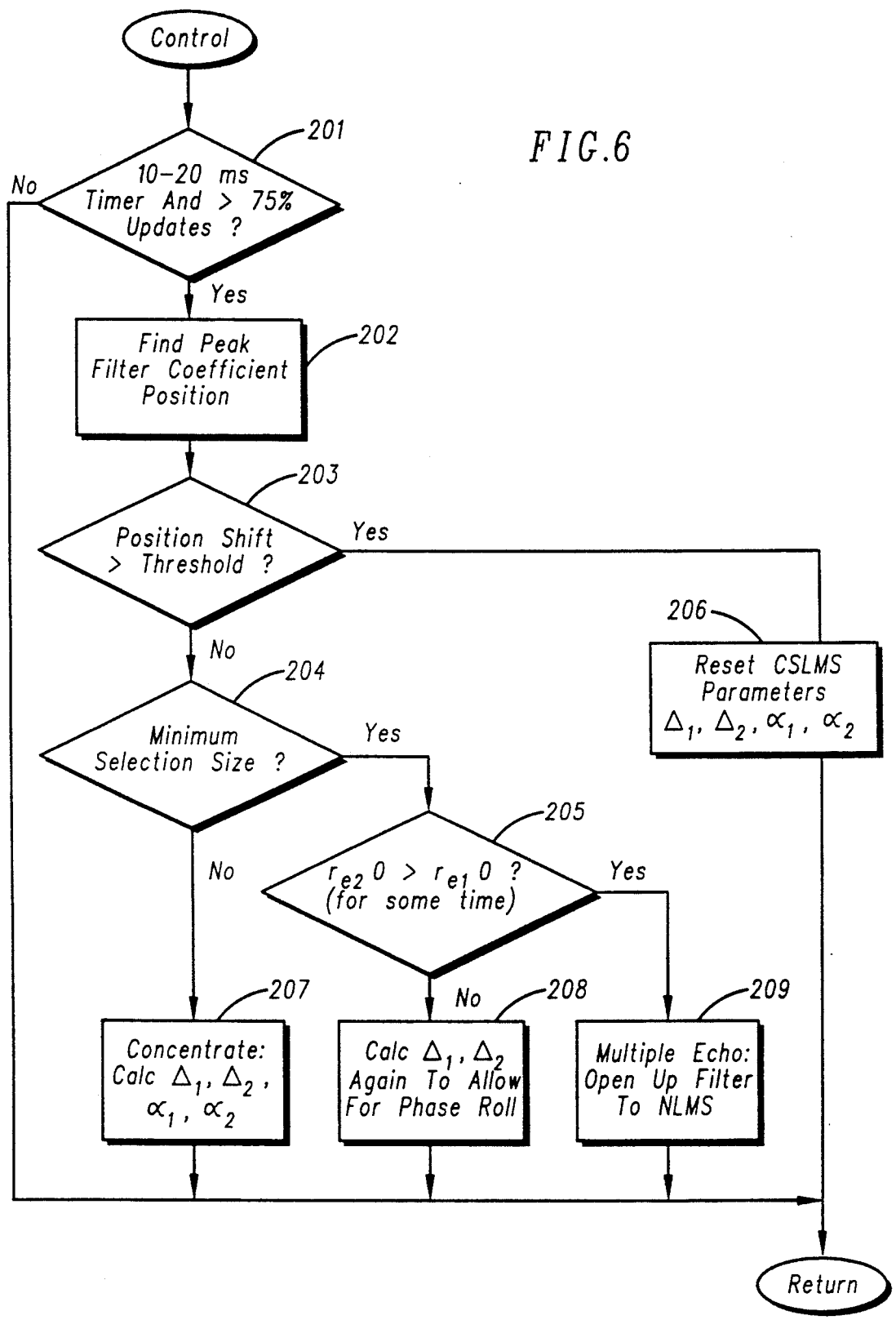
FIG. 6 comprises a flow chart depicting the process of updating vector processing coefficients.

Shown in FIG. 6 is a flow diagram of steps occurring within block 116 of FIG. 5 ("CALL CONTROL ROUTINE") in one embodiment of the invention. Under such an embodiment, the DSP (13) updates vector processing parameters only as required. In step 201 (FIG. 6) the DSP (13) sets a timer for a time period (10-20 ms) and only updates the limits of the narrowed vector ($\Delta_1$ and $\Delta_2$) if at least 75% of the tap values of the filter coefficients have changed in the interim.

If 75% of the filter coefficients have changed then the DSP, again, locates (202) the largest tap value within the filter vector. If the tap position of the largest tap value has shifted tap positions by any more than some threshold value (e.g. 4 tap positions) then the DSP (13) proceeds to redefine (206) concentrated vector parameters ($\Delta_1, \Delta_2, \alpha_1,$ and $\alpha_2$).

If the location of the largest tap has not shifted tap positions by more than the threshold value then the DSP (13) proceeds to determine if the narrowed vector has been reduced to a minimum size (204). If not at minimum size, the DSP (13) continues (207) to reduce the size of the concentrated vector.

If the narrowed vector has been reduced to a final value (204) then the DSP (13) does a comparison of estimated power within the concentrated vector ($r_{e1}(0)$) to power outside the concentrated vector ($r_{e2}(0)$). If the power outside the concentrated vector is greater than the power inside the vector ($r_{e2}(0) > r_{e1}(0)$), for a short period, then the DSP recalculates (208) $\Delta_1$ and $\Delta_2$ to accommodate the possibility that the primary echo has shifted by some amount due to phase roll. If the power outside the concentrated vector remains smaller than the power inside the concentrated vector ($r_{e2}(0) < r_{e1}(0)$) for some time interval then the DSP (13) assumes that multiple echos are present and opens up the concentrated section (209).

Figure 7:
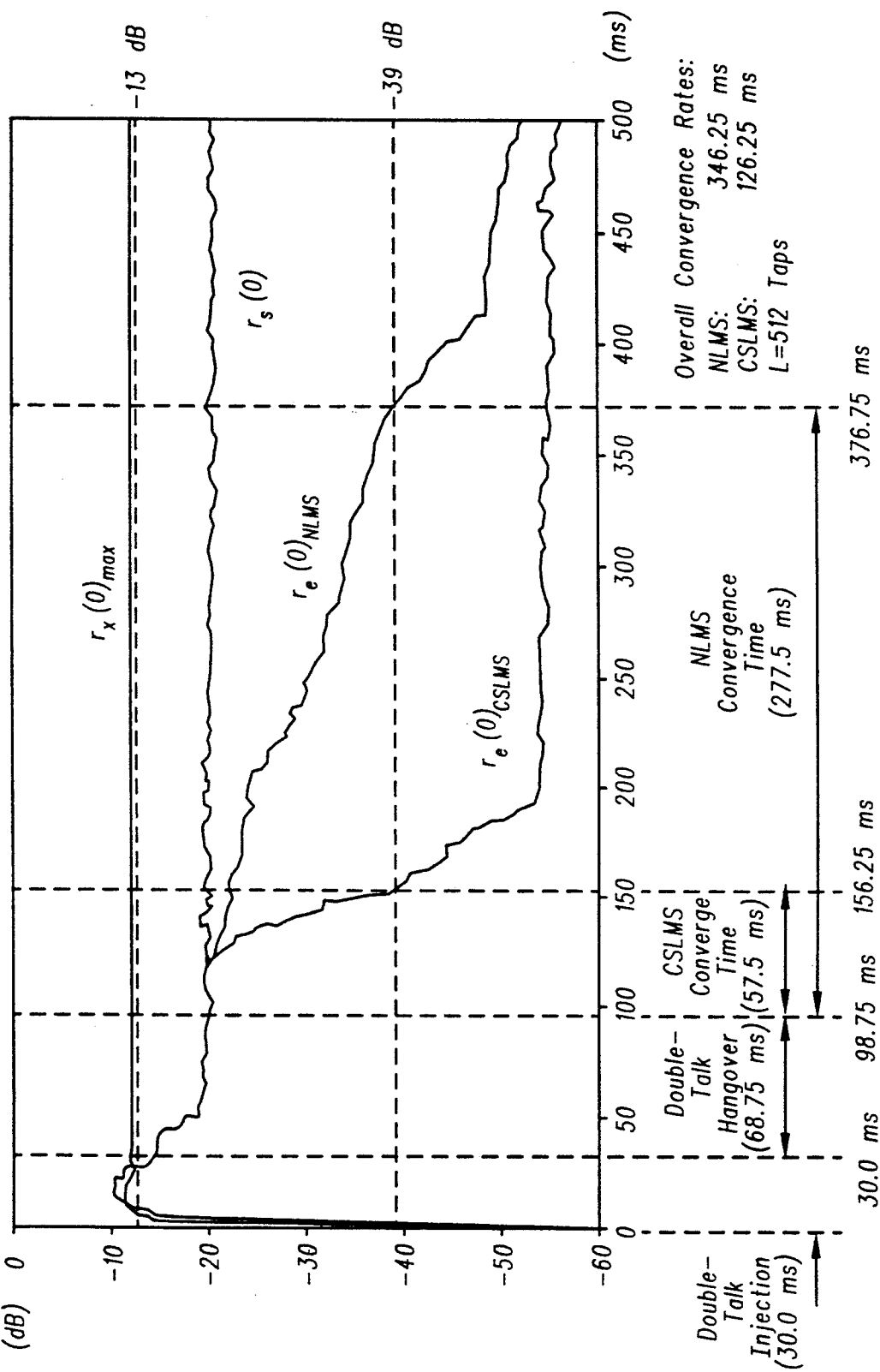
FIG. 7 depicts a graphical comparison of the results of a computer simulation of the echo canceller, in accordance with the invention, with a prior art adaptive echo canceller.

Shown in FIG. 7 is a computer simulation of echo power ($r_e(0)$) for a prior art NLMS adaptive echo canceller versus the invention (CSLMS echo canceller). As can be observed from an examination of FIG. 6, that for a constant maximum average power ($r_x(0)_{max}$) of −13 dB, the inventive concentrated section least-means-square (CSLMS) echo canceller converges to −40 dB in 57.5 ms versus 277.5 ms for the prior art adaptive filter.

We claim:

1. A method of converging an adaptive echo canceller, the method comprising the steps of: locating a representation of a primary echo within a filter vector of a received signal based upon a comparison of relative magnitues of a plurality of taps of the filter vector; dividing the filter vector into a narrowed filter vector proximate the primary echo and a secondary filter vector; estimating a primary error by vector multiplying the narrowed filter vector by a correlative origin signal vector of the narrowed filter vector and subtracting the product from a return signal; estimating a secondary error by vector multiplying the secondary filter vector by a correlative origin signal vector of the secondary filter vector and subtracting the product from the primary error; generating a primary adaptation vector by multiplying the estimated primary error by the correlative origin signal vector of the narrowed filter vector and a narrow vector adaptation factor; generating a secondary adaptation vector by multiplying the estimated secondary error by the correlative origin signal vector of the secondary filter vector and secondary vector adaptation factor; and updating the filter vector by summing with the filter vector within an area defined by the narrowed filter vector the primary adaptation vector and summing with the filter vector within an area defined by the secondary vector the secondary adaptation vector.

2. The method as in claim 1 wherein the step of generating the primary and secondary adaptation vector further comprises the step of dividing the primary and secondary errors by a scaling factor.

3. An apparatus for converging an adaptive echo canceller, the apparatus comprising: means for locating a representation of a primary echo within a filter vector of a received signal based upon a comparison of relative magnitudes of a plurality of taps of the filter vector;

means for dividing the filter vector into a narrowed filter vector proximate the primary echo and a secondary filter vector; means for estimating a primary error by vector multiplying the narrowed filter vector by a respective correlative origin signal vector and summing the vector product with a return signal, and for estimating a secondary error by vector multiplying the secondary filter vector by a respective correlative origin signal vector and summing the product vector with the primary error; and means for updating the filter vector within an area defined by the narrowed filter vector using the primary error and a narrow vector adaptation factor and within an area defined by the secondary vector by using the estimated secondary error and a secondary adaptation factor.

4. In an adaptive echo canceller having a filter vector with taps, each with a tap value, a method of decreasing convergence time, the method including the steps of: locating a representation of a primary echo within the filter vector based upon a determination of a location of the largest tap value; dividing the filter vector into a narrowed filter vector and a secondary filter vector based upon the located primary echo; estimating a primary and secondary error based, in part, upon the narrowed filter vector and secondary filter vector; and, producing an updated filter vector based, in part, upon the estimated errors, a narrow vector adaptation factor and a secondary adaptation factor.

* * * * *